Figure 1:
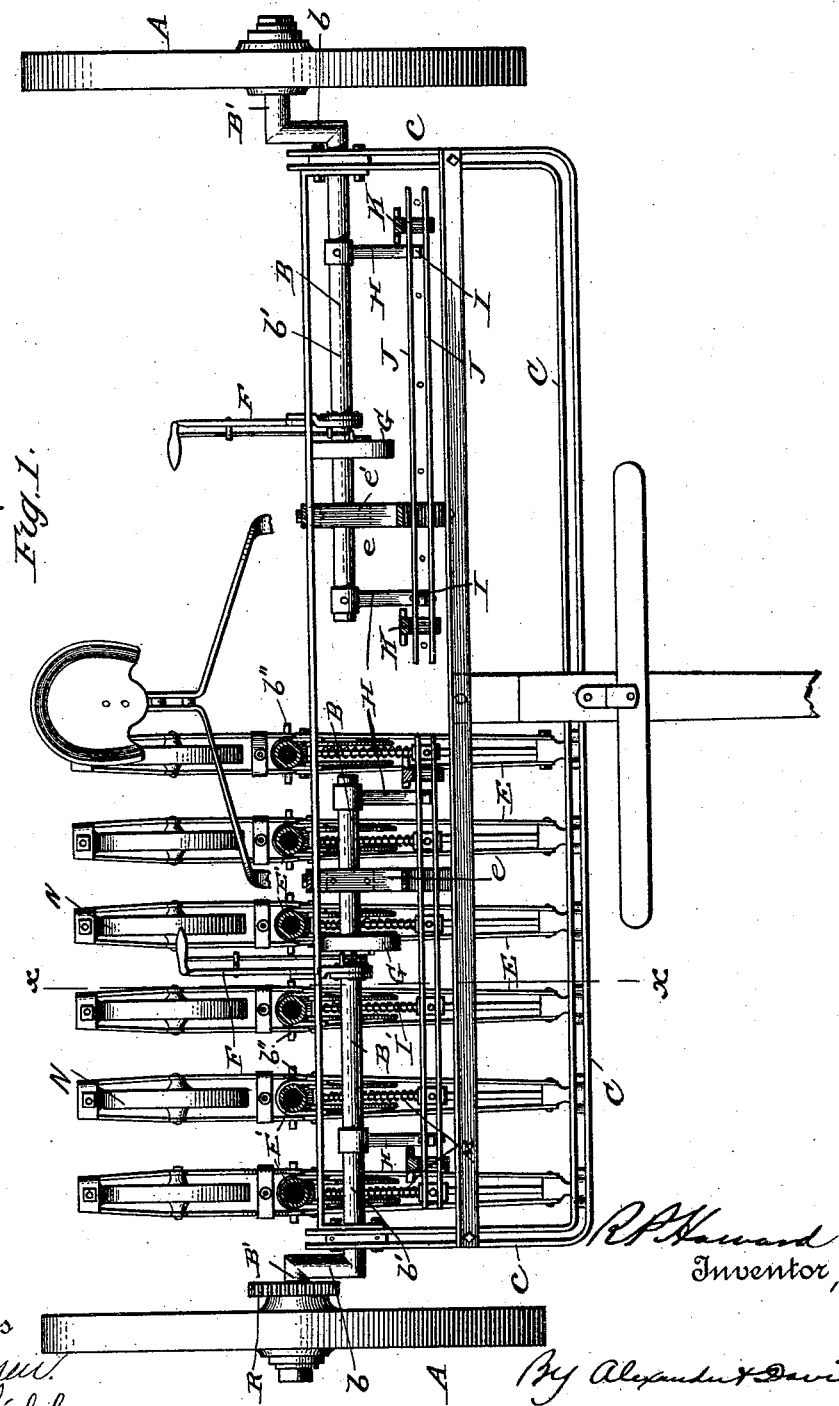

(No Model.)  4 Sheets—Sheet 1.

R. P. HOWARD.
SEED DRILL.

No. 488,072. Patented Dec. 13, 1892.

Witnesses
E. J. Cusser
John M. Walsh

R. P. Howard
Inventor,
By Alexander Davis
Attorneys (No Model.) 4 Sheets—Sheet 2.
R. P. HOWARD.
SEED DRILL.
No. 488,072. Patented Dec. 13, 1892.
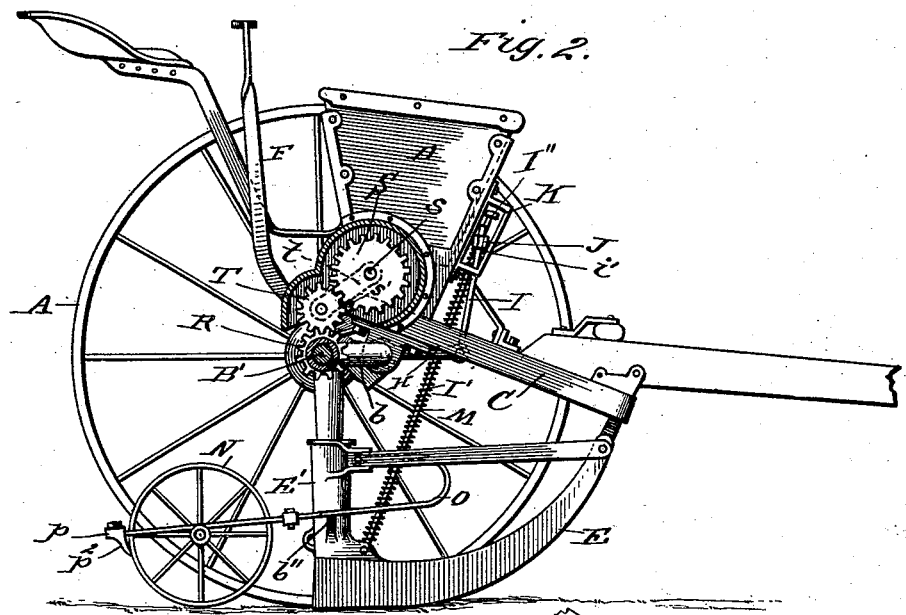
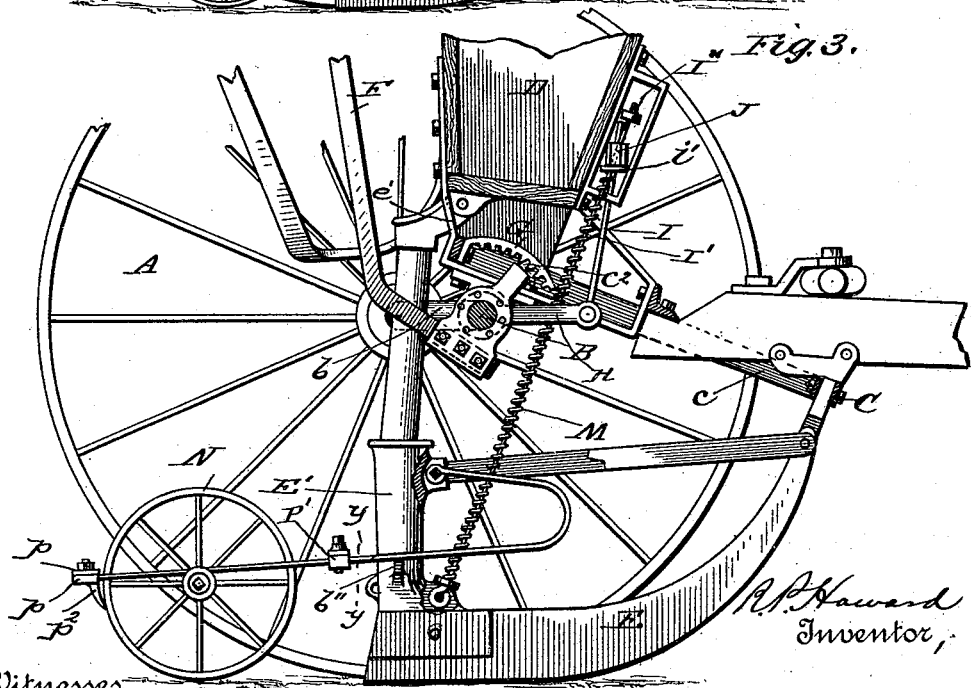
THE NORRIS PETERS CO., PHOTO-LITHO., WASHINGTON, D. C.

(No Model.) 4 Sheets—Sheet 3.
R. P. HOWARD.
SEED DRILL.
No. 488,072. Patented Dec. 13, 1892.
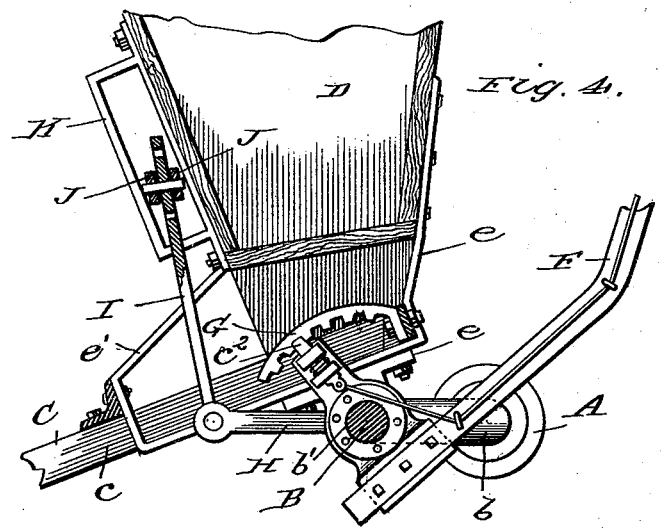
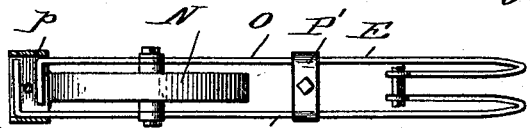
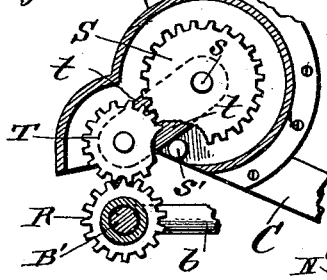
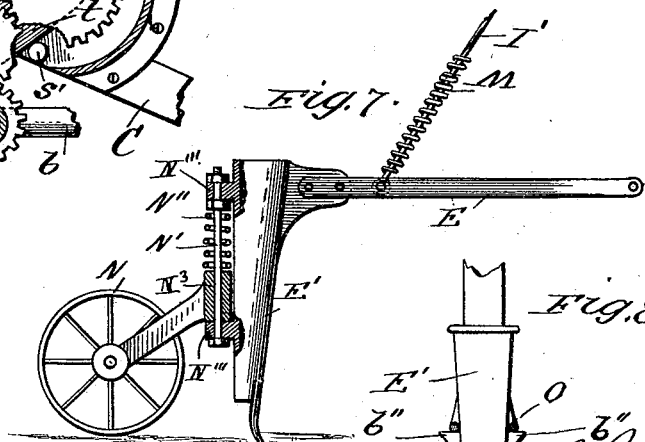
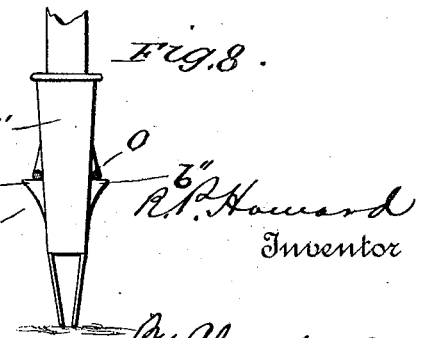
Witnesses
E. J. Lussen
John M. Walsh.
R. P. Howard
Inventor
By Alexander & Davis
Attorneys (No Model.) 4 Sheets—Sheet 4.
R. P. HOWARD.
SEED DRILL.
No. 488,072. Patented Dec. 13, 1892.
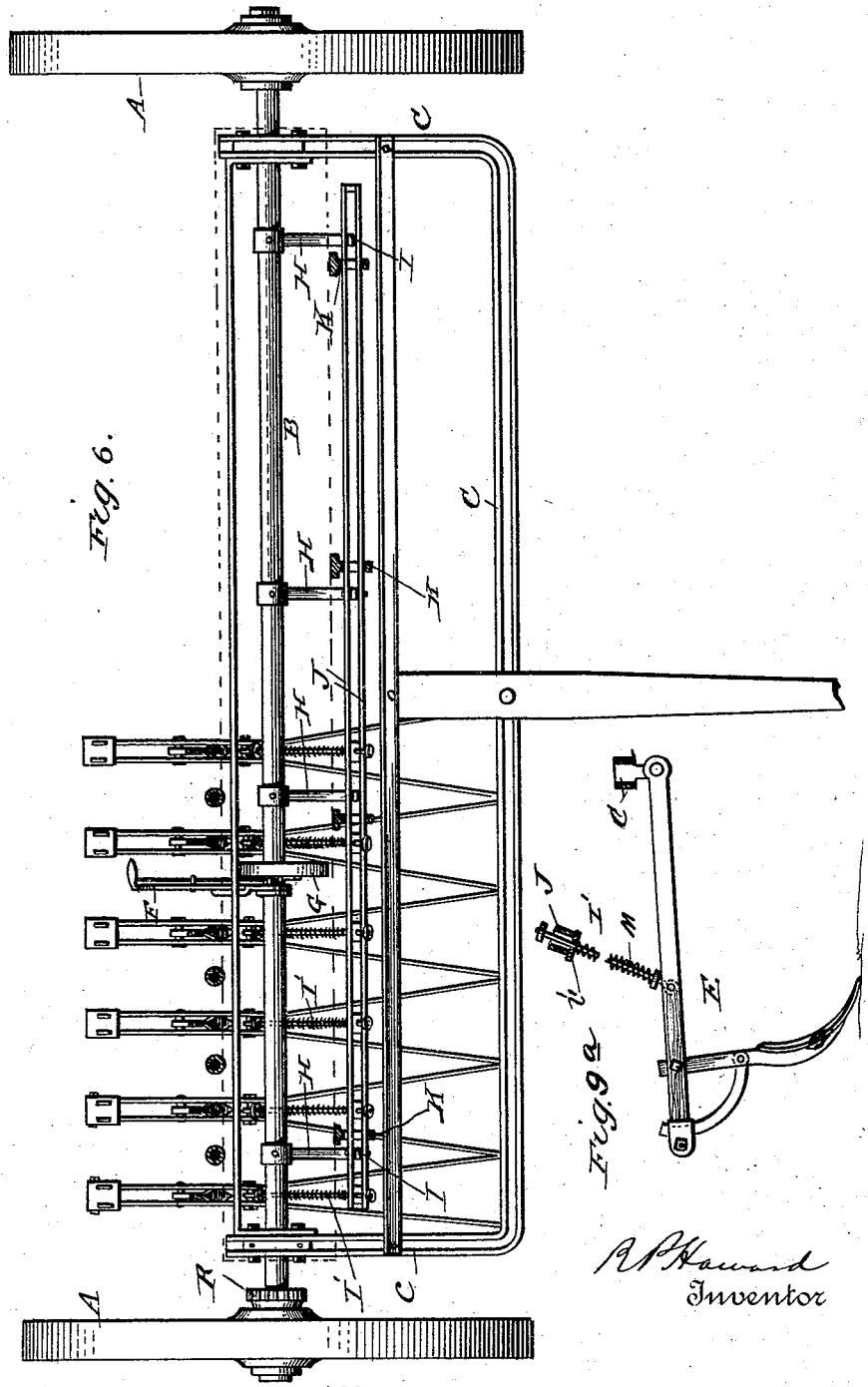

UNITED STATES PATENT OFFICE.

RUFUS P. HOWARD, OF LA CROSSE, WISCONSIN.

SEED-DRILL.

SPECIFICATION forming part of Letters Patent No. 488,072, dated December 13, 1892.

Application filed March 22, 1892. Serial No. 425,923. (No model.)

*To all whom it may concern:*

Be it known that I, RUFUS P. HOWARD, a citizen of the United States, residing at La Crosse, in the county of La Crosse and State of Wisconsin, have invented certain new and useful Improvements in Seed-Drills, of which the following is a specification, reference being had therein to the accompanying drawings.

My invention relates to seeding-machines of the class wherein are employed a series or gangs of drills having shoes, hoes, or teeth to open the ground for the reception of seed or grain discharged from a box or hopper mounted over the drills and suitable covering devices to cover the deposited seed.

My object is to provide improved means for the easy adjustment to proper operative position of the drills with their accompanying parts; to provide means whereby the opening devices may be held yieldingly in operative position; to provide improvements in the covering devices, and, finally, to provide, in view of the raising and lowering devices employed, peculiar gearing for driving the feeding devices in the box or hopper for the discharge of their contents.

To these ends said invention consists in the construction and combination of parts, substantially as hereinafter specified and claimed.

In the drawings, Figure 1 is a plan view of a seeding-machine constructed in accordance with my invention, the hopper or seed-box being removed and but one side being equipped with the drills. Fig. 2 is a side elevation with one of the carrying-wheels removed; Fig. 3, a longitudinal section on line $x$ $x$ of Fig. 1; Fig. 4, a detail view in section looking in a direction opposite to Fig. 3; Fig. 5, a detail view in plan of the covering device employed; Fig. 6, a view similar to Fig. 1, showing a straight continuous axle and continuous presser-bars, Sheet 4; Fig. 7, a detail view in elevation and partly in section showing a modification of the opening and covering devices; and Fig. 8, a view of the shoe in section on line $y$ $y$, Fig. 3, Sheet 3; Fig. 9, a detail view of the furrow-opening device shown in plan in Fig. 6, Sheet 4; Fig. 10, Sheet 3, a detail view of the gearing for driving the seeding devices.

Referring to the drawings in detail, A and A designate the two carrying-wheels, mounted each on the outer end of one part B of a two-part axle. The radial portion $b$ of each axle part or section is quite close to the inner side of the wheel, and secured to the inwardly-extending part $b'$, close to the radial part, is the forwardly-extending member $c$ of a light frame C, which at its rear portion, directly over the part $b'$ of the axle, supports the hopper or grain-box D, while to its front portion are pivotally attached the front ends of the series of runners or shoes E of usual construction for opening the furrows. To the rear portions of each of the shoes E is attached a drill-tube E', connected in the usual way with the hopper. The inner ends of each axle part B is connected by a boxing $e$ and bracket $e'$ to the hopper, so that by this means and the frame C the two axle parts are kept in alignment. Attached to the cranked part of each axle-section is a lever F, being placed within convenient reach from a seat located at the center of the machine, by means of which the axle may be moved with the center of the wheel A as its axis, and thus the frame C, with all the parts attached, is raised from the ground. In order to render the lever F effective, although attached to the cranked portion of the axle, the part to be grasped is carried to a point on the side of the center of motion opposite such cranked part—that is, on the opposite side of the wheel-spindles—as shown. A rack or toothed segment G, secured to a portion of the frame C beneath the hopper and adapted to co-operate with a spring-pressed pawl $C^2$ of usual structure that is secured to the lever F, constitutes means for locking the parts in the position to which they may be moved by the use of the lever F. The manner in which said segment and pawl operate will be readily understood by giving attention to the following consideration, viz: The center of motion of the frame C and its attached parts, the seed-box, &c., is the front end of the tongue or pole and the cranked part $b'$ of the axle is between said center and its own center of motion, the wheel-hub. Now as the segment G is above the axle part $b'$ and the pawl-carrying part of the lever F stands at an angle which enables said pawl to engage the segment-teeth in advance of and above the axle part $b'$ it will be seen that so long as the point of engagement of the pawl and segment is above a horizontal line passing from the lever's center of motion said parts will be locked against descent by reason of the fact that the distance from center to center is less than the aggregate distance from the center of the wheel A to the pawl and segment-engaging point and the distance from the latter to the end of the tongue or pole. In other words, the condition is similar to that where two bars are hinged together with their free ends fixed and the bars so arranged that their joint is above a line drawn from the fixed end of one bar to the fixed end of the other.

Fixedly attached to the cranked part of the axle-sections and extending forward therefrom are several arms H, to the front end of each of which is pivotally attached the lower end of an upwardly-extending bar or link I. The upper ends of the bars I are contained between and fixed to two parallel bars J J, which extend horizontally across the machine directly in front of the hopper, being held in place by brackets K attached to the latter, and of such shape as to allow a certain amount of vertical movements of the bars. It is to be noted that there are two pairs of bars J and J; but I do not limit myself, however, to this construction, as I contemplate using continuous bars, as shown in Fig. 6. From each drill or shoe E rises a rod I' of such length as to extend up between the two bars J to a point at or near the highest point to which these are capable of movement, and upon the end of such rod is a collar or nut I''. Surrounding each rod between its point of attachment to the drill and the under side of the bars J is a coiled spring M. Said spring is prevented from passing up between the bars by a collar or plate $i'$, through which the rod may freely move and which is in contact with the under sides of the bars J. As thus arranged the spring M serves to transmit to the shoe E any pressure or force which may be applied to the bars J, and thus compel the latter to open a furrow for the seed. Should, however, a rock or other hard substance be encountered, it will yield and allow the shoe to ride over the same. If it is desired to use the machine without this pressure, the spring may be removed. It will be seen that the force applied to the shoe E depends on the tension of the coiled spring M and that the tension of the latter is according to the distance between the point of attachment of the rod I' encircled thereby to the shoe and the presser-bars. Therefore by swinging the cranked axle upward by means of the lever F the presser-bars, through arms H and links I, will be raised and the springs thus relaxed, while by lowering the axle the presser-bars will be carried downward and the springs placed under tension accordingly, and as the frame C, the seed-hopper, and the other parts carried by said frame are attached to the axle it will be apparent that their weight in tending to move the axle downward operates to compress or place under tension the springs M and to an extent determined by the point of engagement of the pawl-and-segment device, which, as has been before set forth, acts to limit the downward movement of said parts. Thus by cranking the axle and attaching the described parts thereto in the manner set forth I utilize the weight of said parts to compress the springs and to maintain them under the tension described. When the axle is swung upward with a view to raise the shoes entirely from the ground, said shoes will be raised not only because of their connection at their front ends with the frame C, but also because of their connection at their ends with the axle through the medium of the rods I', the presser-bars J, the links I, and the arms H, and as the point of connection between the arms H and links I describes a greater arc than the cranked portion $b'$ of the axle it will be seen that the amount of movement given to said shoes by the connections with their rear ends is greater than that imparted by the raising of the frame C, so that said rear ends will be raised proportionately higher than the front.

The coverer I employ consists of a wheel N, journaled in boxes attached to two horizontal parallel rods O O, whose forward ends are bowed to make them springy or elastic, and are attached to the drill-spout E' on its front side near its upper edge by such means that the attached portions will be rigidly held. At its rear end each rod O is bent inward in a horizontal plane toward the other rod, and these bent ends are clamped between two plates $p\,p$. This device is in rear of the wheel, and in front thereof a clip P', formed of two plates, connects the rods and braces them. The expedient of the inwardly-bent ends held between plates absolutely prevents torsion or twisting of the rods, and so maintains the wheel in a vertical position, not allowing it to vibrate laterally. To the under side of the lower plate $p$ a scraper or cleaner $p^2$ is attached to clear the tread of the wheel. The coverer-wheels are limited in their downward movement by means of lugs $b''$ on the sides of the drill, with whose upper sides the rods are adapted to engage.

Owing to the cranking of the axle and the varying position of the hopper in consequence, caused by moving said axle, I have had to provide gearing to drive the feed mechanism in the hopper from one of the carrying-wheels, which will always operate, notwithstanding changes in the position of the hopper relative to the axle portion $b'$, on which said wheel is journaled. Said gearing consists of a gear-wheel R on the axle portion B', a second wheel S on the feed rod or shaft $s$ in the hopper, and an intermediate gear T in mesh with these two. The gear T is journaled on one end of an arm $t$, that is hung or pivoted on the rod or shaft $s$, and so is capable of altering its position and yet keeping in mesh with both wheels R and S, notwithstanding changes in the relative positions of the latter. Said wheel T is so placed that its gravity tends to hold it in meshing positions, and a suitable pin or lug $s'$, fixed on the end of the hopper, is adapted to be engaged by the arm $t$ to limit the movement of the wheel into mesh with the others. When the drills are lifted entirely from the ground, said pin operates to hold said wheel entirely out of mesh, and so stop the seed-sewing.

In Fig. 7 is shown a different form of spring-pressed covering-wheel from the one described, and the runner or shoe form of opener is dispensed with and a hoe or tooth used instead.

In this construction the arms carrying the covering-wheel are connected to a sliding block $N^3$, which is mounted on a vertical rod $N'$. This rod is secured between two lugs $N'''$, formed on the rear of the drill-spout, a coiled spring $N''$ being interposed between the sliding block and the upper lug to normally press said block and arms connected thereto and the covering-wheel carried by said arms down.

I wish it understood that as there are features of my invention adapted for use with other than cranked axles I reserve to myself the right to use them with other kinds, and although preferring to connect the axle with the presser-bars J by means described, I contemplate attaching said pressure-bar to the hopper or seed-box.

In Fig. 6 I show a machine provided with a straight and continuous axle, and though I have provided the gearing for operating the seed-feeding devices especially with reference to the use of the cranked axle I propose to use such gearing in connection with a straight axle as well.

Having thus fully described my invention, what I claim, and desire to secure by Letters Patent, is—

1. The combination of supporting-wheels and a cranked axle, the cranked portion of the axle extending forwardly, a frame C, having its rear end supported upon the cranked portion of the axle, a tongue projecting forwardly from frame C, furrow-opening devices depending from the frame and connected by suitable tubes to a hopper on the frame, a curved rack G, secured to frame C directly over the cranked portion of the axle, a lever F, secured rigidly to the cranked portion of the axle and extending rearwardly beyond the pivotal points of the axle, and a spring-pawl $c^2$, carried by an extension of the lever and working in rack G, as and for the purpose described.

2. The combination of a cranked axle mounted on wheels, a frame pivotally supported on its cranked portion, and a forwardly-extending tongue secured to the frame, a hopper on the frame, furrow-opening devices pivoted to the frame and carrying spouts communicating with the hopper, a rack on the frame and a lever on the axle engaging this rack, arms H, secured to the axle and extending forwardly therefrom and carrying upwardly-extending rods I, a presser-bar carried by these rods, and spring-surrounded rods connecting the presser-bar to the furrow-opening devices, substantially as described.

3. The combination of a cranked axle mounted on wheels, a frame pivotally supported on the cranked part of the axle and provided with a tongue extending forwardly, a hopper and seed-feeding devices mounted on the frame above the axle, a rack on the frame and a lever on the cranked part of the axle adapted to engage the rack, a gear-wheel on the end of the axle and one on the adjacent end of the feed-shaft, a rearwardly and downwardly extending arm pivoted to the feed-shaft and carrying a gravitating gear-wheel adapted to mesh with both said gears, a stationary stop $S'$ for holding this gravitating gear out of mesh when the furrow devices are raised, and furrow-opening devices, substantially as described.

In testimony whereof I affix my signature in presence of two witnesses.

RUFUS P. HOWARD.

Witnesses:
W. H. DAVIS,
H. A. DAVIS.